(12) United States Patent  (10) Patent No.: US 8,936,042 B2
Eliason  (45) Date of Patent: Jan. 20, 2015

(54) DUAL CONTROL DEAD MAN SYSTEM (71) Applicant: Keith Eliason, Virginia Beach, VA (US)

(72) Inventor: Keith Eliason, Virginia Beach, VA (US)

(73) Assignee: Graco Minnesota Inc, Minneapolis, MN (US)

( * ) Notice: Subject to any disclaimer, the term of this patent is extended or adjusted under 35 U.S.C. 154(b) by 66 days.

(21) Appl. No.: 13/624,994

(22) Filed: Sep. 24, 2012

(65) Prior Publication Data

US 2014/0084193 A1    Mar. 27, 2014

(51) Int. Cl.
F16K 31/12 (2006.01)
F16K 17/00 (2006.01)
B24C 7/00 (2006.01)

(52) U.S. Cl.
USPC .................. 137/625.2; 451/101; 137/625.64; 251/26

(58) Field of Classification Search
CPC . F16K 11/0716; F16K 11/0743; F16K 11/07; F16K 31/42; F16K 31/1221; F16K 31/124; B24C 7/00; B24C 7/0046; B24C 7/0053; B24C 5/02
USPC .............. 137/625.2, 625.64; 451/101; 251/26
See application file for complete search history.

(56) References Cited

U.S. PATENT DOCUMENTS

| 3,543,444 | A | * | 12/1970 | Mehta | 451/2 |
| 3,828,478 | A | * | 8/1974 | Bemis | 451/90 |
| 4,026,326 | A | * | 5/1977 | Wells et al. | 137/625.66 |
| 4,046,165 | A | * | 9/1977 | Rose et al. | 137/624.27 |
| 4,135,068 | A | * | 1/1979 | Burns | 200/61.85 |
| 4,735,021 | A | * | 4/1988 | Smith | 451/2 |
| 4,802,313 | A | * | 2/1989 | Smith | 451/90 |
| 4,914,721 | A | * | 4/1990 | Glaeser et al. | 307/116 |
| 5,024,029 | A | * | 6/1991 | Abbott et al. | 451/101 |
| 5,228,622 | A | * | 7/1993 | Murphy et al. | 239/126 |
| 5,484,325 | A | * | 1/1996 | Shank | 451/38 |
| 5,524,821 | A | * | 6/1996 | Yie et al. | 239/10 |
| 5,934,971 | A | * | 8/1999 | Thompson et al. | 451/2 |
| 5,957,148 | A | * | 9/1999 | Sell | 137/115.21 |
| 6,167,901 | B1 | * | 1/2001 | Yoshinura | 137/269 |
| 2005/0060833 | A1 | * | 3/2005 | Guest et al. | 15/321 |
| 2006/0011457 | A1 | * | 1/2006 | Robertson | 200/51 LM |

* cited by examiner

Primary Examiner — John Rivell
Assistant Examiner — Kevin Barss
(74) Attorney, Agent, or Firm — Bernard G. Pike; Pike IP Law, PLLC (57) ABSTRACT A dual control shut off system, such as a dead man system for a blasting system, blasting equipment, or other equipment having both pneumatic and electric safety control circuits, may include an electric dead man's switch or a pneumatic dead man's switch. An embodiment of the dual control dead man system is for wet abrasive blasting systems used for cleaning, preparing surfaces, removing coatings, and/or other abrasive blasting operations. Embodiments of the dual control shut off system provide the ability to conveniently switch between an electric and pneumatic shut off system.

12 Claims, 5 Drawing Sheets

DUAL CONTROL DEAD MAN SYSTEM

FIELD OF THE INVENTION

The invention is directed to a dual control shut off system, such as a dead man system for a blasting system, blasting equipment, or other equipment having both pneumatic and electric safety control circuits. An embodiment of the dual control dead man system is for wet abrasive blasting systems used for cleaning, preparing surfaces, removing coatings, and/or other abrasive blasting operations. Embodiments of the fluid control circuit provide the ability to switch between an electric and pneumatic shut off system.

BACKGROUND

To remove the paint, dirt or other surface coating from a substrate such as a surface to be painted or cleaned, a blasting system is desirable and effective. There are a variety of blasting processes for these purposes, including, but not limited to, water blasting, dry abrasive blasting, wet abrasive blasting, and wet cutting systems, for example. In certain applications, blasting processes are able to efficiently cut, clean or remove a coating from a substrate.

Though generally safe, blasting systems include several safety precautions. Blasting systems are designed to spray high velocity streams of compressed air, fluids, and/or abrasive particles on a surface. A misdirected blast spray stream may cause harm to an operator.

Further, all types of abrasive and water blast systems may comprise an automatic control circuit to shut off the flow to the spray nozzle if the nozzle is dropped or a handle is otherwise released. These handles are generally called "dead man's switches." For abrasive or water blasting systems, a dead man's switch is typically a spring-loaded handle that must be biased against the spring and sufficiently depressed to start and maintain the blasting operation. If the handle is released, the spring biases the handle to its original position and the flow of abrasive to the blast nozzle is stopped. As such, a dead man's switch is designed to automatically shut down the blasting operation in case the operator becomes incapacitated or otherwise loses control of the hose or nozzle, such as by injury, loss of consciousness, death, or other reason. The blasting processes may also be deliberately shut down using the dead man's switch.

Conventionally, dead man's switches may be either pneumatically controlled or electrically controlled. More often for blasting systems, abrasive blasters are controlled pneumatically with a pneumatic dead man's switch. Since abrasive blasters are typically powered by compressed air, it is logical to utilize some of the compressed air to operate the control circuits, regulate pressures, and to turn on and off relays and diaphragm valves, etc. Traditionally, the pneumatic dead man's switch acts to turn on or off an air relay valve that in turn controls diaphragm valves and air regulators that control (turn on and off) the flow of the blasting media.

Conventionally, most blast systems comprise a pneumatically operated dead man system. However, currently, the rules of the Occupational Safety and Health Administration (OSHA) may require that a dead man circuit be electrically operated on abrasive blast systems if the blast hose exceeds 150 feet in length. Over such distances, electrically operated dead man's switches can shut down the blast stream faster than pneumatically operated systems. A longer pneumatic hose is filled with more air and it takes a longer time for the pressure within the hose to drop sufficiently to switch the relay valve. This is due to a "balloon effect" developed in the long runs of pneumatic lines. The balloon effect results in a slower release of pressure from the control line 14b and therefore, the shut-off valves remain open for a time period after the handle of the dead man's switch is released. OSHA rules state that this balloon effect results in too long of a time delay between the release of the handle and the closing of the shut-off valves if the air hoses are longer than 150 feet.

In most cases for blasting systems, it is more convenient and less expensive to pneumatically control the dead man circuit. However, there are various applications for blasting systems and, consequently, an abrasive blasting system comprising a pneumatically operated dead man's switch may need to be converted to an electrically operated dead man's switch. Conventionally, the conversion involved the expensive replacement of the air relay valve, the replacement of the blast hose dead man airline with electrical cords, the replacement of the dead man's switch from pneumatic to electric switch, as well as re-plumbing internal control lines or hoses. A complicated portion of this conversion is the replacement of the air relay or components, re-routing the tubing and wiring of the air relay valve, as well as making modifications to the internal control tubing circuits.

There is a need for a blast system with a simple dead man control circuit that may be easily converted from a pneumatically controlled system to an electrically controlled system. In the past, switching from pneumatic to electric control of a dead man safety system has been overly complicated and required extensive training before a technician became fully proficient in the conversion.

SUMMARY

Embodiments of a safety shut-off system capable of being controlled by either an electric dead man switch or a pneumatic dead man switch comprise a three-way relay valve comprising an electrical connection and a pneumatic connection. The electrical connection is capable of energizing an electrical coil to operate a solenoid to shift the plunger of the three-way relay valve. In this embodiment, a source of pressurized gas is connected to a first inlet of the three-way relay valve to provide pressurized gas to the control circuit. A control circuit is connected to the outlet of the three-way relay valve. In one embodiment, the three-way relay valve is a normally closed valve, for example, the plunger of the three-way valve is biased to close the orifice by a spring. The three-way valve may comprise an electrical connection for activating the solenoid and a pneumatic connection. The electric dead man's switch may be connected to the electrical connection for activating the electric coil and a pneumatic dead man's switch connected to the pneumatic connection. Both methods, the electrical activation of the electric coil and the mechanical activation done by the pneumatic circuit, cause the same result; supply air in the control circuit which causes blasting to begin.

Embodiments of the control circuit comprises pneumatic piping system connected to at least one shut-off valve and connected to an outlet of the relay valve; wherein the pneumatic connection is configured to vent to atmosphere when the electrical dead man switch is connected to the electrical connection and the same pneumatic connection is configured to receive pressurized gas from the pneumatic dead man's switch, when the pneumatic dead man switch is connected to the pneumatic connection.

The electrical system functions because the electrical dead man's switch activates a solenoid that shifts a spool and this provides fluid communication from the source of pressurized gas to the control circuit. The pneumatic system functions because the pneumatic handle does not supply pressurized gas unless the handle is depressed. In the three-way relay valve the pneumatic connection from the pneumatic dead man is in fluid communication with the spool's vent circuit. Activation of the pneumatic dead man shifts the spool and this provides fluid communication from the source of pressurized gas to the control circuit apart from the solenoid.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of components, parts, techniques and steps are disclosed. Each of these has individual benefit and each can also be used in conjunction with one or more, or in some cases, all of the other disclosed embodiments and techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

DESCRIPTION

Blasting systems and processes may be used for a variety of operations including cutting materials, remove paint, dirt, rust, or other surface coatings from a substrate. There are a variety of blasting processes for these purposes, including, but not limited to, water blasting, dry abrasive blasting, wet abrasive blasting, and wet cutting systems, for example. In certain applications, blasting processes are able to efficiently cut, clean or remove a coating from a substrate by directing an abrasive media to the substrate. To improve control and provide safety for the operator, blasting systems typically comprise a dead man's switch that must be engaged to enable blasting media to pass through the blast hose and be directed onto a substrate to perform the desired blasting operation. If the dead man's switch is released, the blasting operation will be automatically stopped. The dead man's switch is typically connected adjacent to a blast nozzle (but it can also be remotely located) so the operator may conveniently engage the switch to start the blasting process and release the dead man's switch to stop flow of the abrasive media, as desired. In conventional systems, the dead man's switch is configured in its engaged position to provide control air to pneumatically open normally closed safety shut off valves. Since the conventional air relay valves are pneumatically controlled, switching to an electrically controlled dead man's switch may involve a complicated process.

The inventor discovered that a pneumatically controlled dead man's switch could be installed with an electrically controlled relay valve in the dead man's pneumatic circuit that could provide a simple method of conversion from a pneumatically controlled dead man's switch to an electrically controlled dead man' switch and vice versa.

Figure 1:
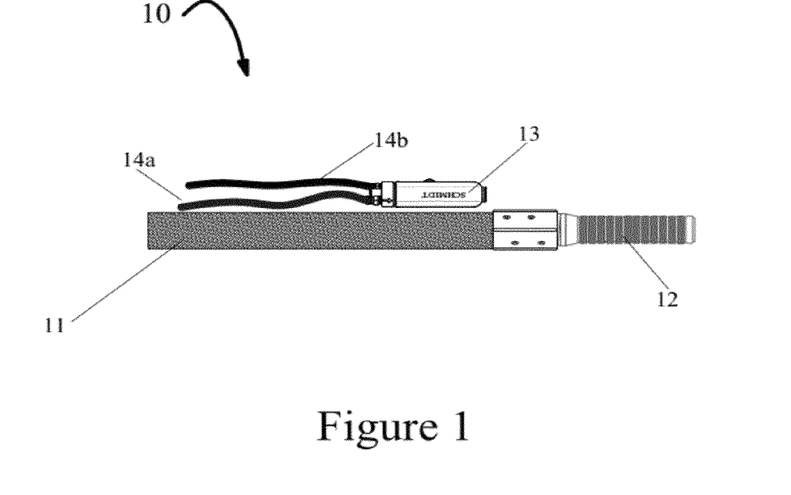
FIG. 1 depicts the blast end of a typical blast hose with blast nozzle and a pneumatically operated dead man's switch.

A typical blast hose 10 comprising pneumatically operated dead man's switch 13 is shown in FIG. 1. The blast hose 10 comprises a blast hose 11 and a blast nozzle 12. The blast hose 11 carries a stream of fluid and/or abrasive which may be directed on to a substrate through the blast nozzle 12. The handle of the dead man's switch 13 must be engaged or squeezed, and continue to be held in the engaged position, to allow the blast system to supply the blast stream to the nozzle 12. The pneumatic dead man's circuit comprises twin pneumatic lines 14a and 14b. Of the two pneumatic lines, one is a pressurized gas supply line 14a in fluid communication with a source of pressurized gas (the pressurized gas is typically pressurized air, such as pressurized air from an air compressor) and is connected to an inlet port of the dead man's switch 13; the other line is a control line 14b that connects the pressurized gas supply line 14a to the relay valve 21 (See FIGS. 2 through 5). The dead man's switch 13 comprises a valve that is biased into a closed position and, when engaged, provides fluid communication between the pressurized gas supply line 14a and the control line 14b. By engaging or depressing the handle of the dead man's switch 13, the dead man valve is opened providing fluid communication between the pressurized gas supply line 14a to the control line 14b thereby supplying pressurize air to the control line 14b and relay valve 21.

Figure 2:
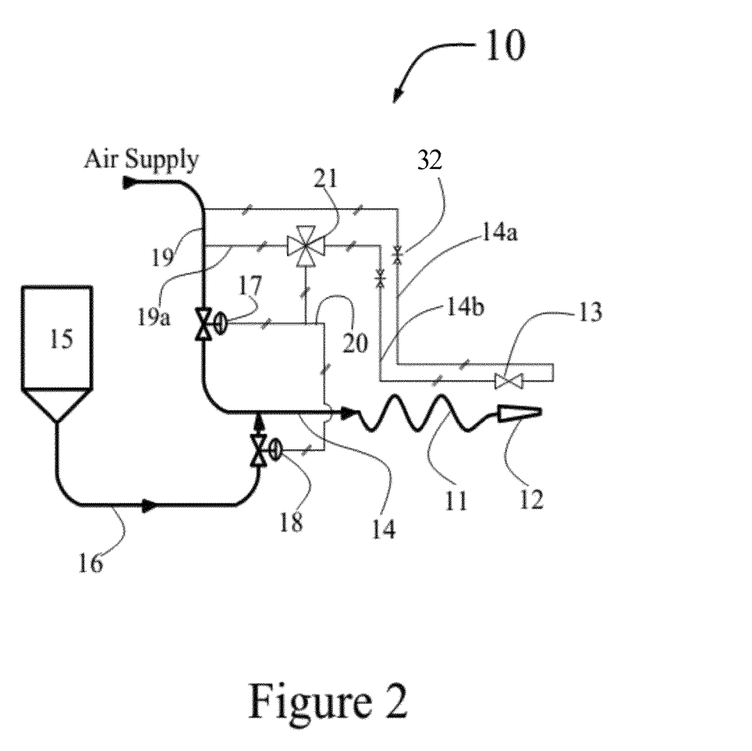
FIG. 2 depicts a wet abrasive blasting system comprising an embodiment of a dual controlled dead man's system configured for use with a pneumatic dead man's switch.

An embodiment of the dual control shut off system, configured for use with a pneumatically controlled dead man's switch on a wet abrasive blasting system, is shown in FIG. 2. The embodiment shown in FIG. 2 is depicted as a wet abrasive blasting system but the dual control dead man's system may be used on other blasting systems or other equipment that would benefit from a dual controlled dead man's system. In the embodiment shown, the pneumatically controlled dead man system comprises an electrically controlled relay valve 21. The wet abrasive blasting system of FIG. 2 comprises a blast pot 15, slurry piping system 16, pressurized gas piping system 19, abrasive media piping system 14 including blast hose 11 and blast nozzle 12. The slurry piping system 16 comprises slurry shut off valve 18. Slurry shut off valve 18 in the closed position prevents slurry from flowing into the abrasive media piping system 14 and in the open position allows slurry to flow into the abrasive media piping system 14. Similarly, the pressurized gas piping system 19 comprises air shut off valve 17. Shut off valves 17 and 18 remain closed unless the dead man's switch is engaged. The pneumatic dead man's switch control line 14b may be connected to an exhaust outlet ((FIGS. 4 and 5, 21d) for the spool chamber of the relay valve 21, normally used just as a vent for the spool chamber (FIG. 5, 26). The pneumatic dead man's switch is capable of pressurizing the spool chamber (FIG. 5, 26) of the relay valve sufficiently to shift a spool to its operating position.

The pneumatic dead man's system as shown in FIG. 2 comprises pressurized gas supply line 14a, dead man's switch 13, and control line 14b connected to relay valve 21 at the pneumatic dead man's port (FIG. 4-21d), as well as other components. Under the pressure provided by control line 14b, when the dead man's switch is engaged, a spool in the relay valve 21 shifts from a venting position (see FIG. 4) to an operating position (see FIG. 5), thereby providing pressurized control air to control circuit 20. The pressurized gas in the control circuit 20 opens normally closed air shut-off valve 17 and slurry shut-off valve 18 so the blasting media may flow to and through the blast hose 11 to the blast nozzle 12 to begin the blasting operation. If the dead man's switch is released, the control system 20 is vented through the relay valve 21 as the spool returns to the venting position, thereby releasing pressure from the relay valve 21 and control circuit 20 causing the shut off valves 17 and 18 to close.

More specifically, if the handle of the dead man's switch 13 is released, the valve of the dead man's switch 13 is biased closed, pressure is released from the control line 14b, the spool in the relay valve 21 is biased to the venting position (see FIG. 4) causing the pressurized gas in the control circuit to be vented through a vent port (FIG. 4-21b), and the shut-off valves 17 and 18 return to the closed position. The shut off valve 17 and 18 may be reopened by again engaging the dead man's switch, thereby pressurizing the control circuit 20 as described above.

Figure 3:
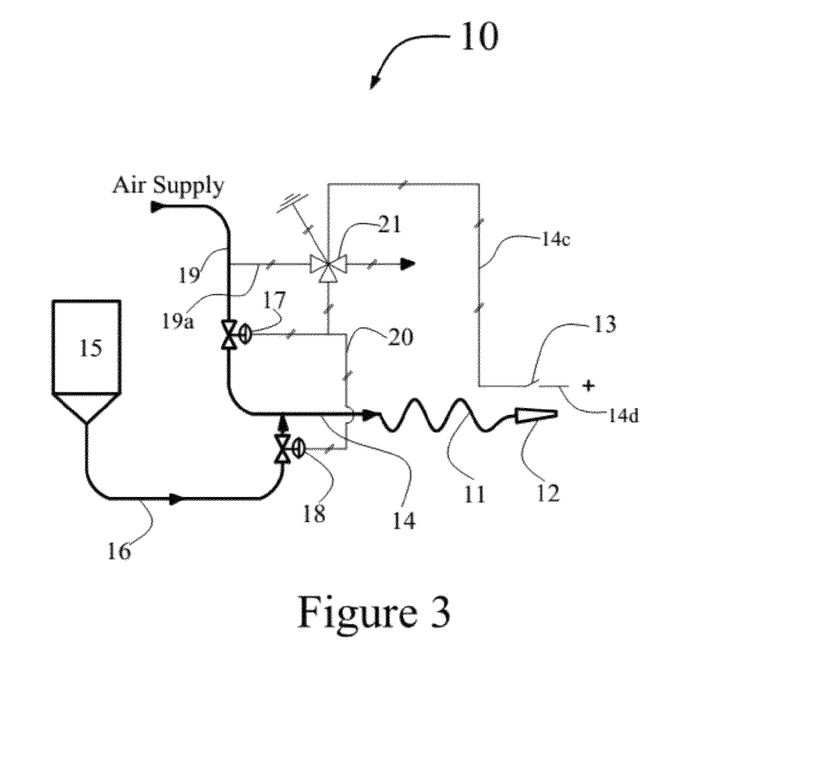
FIG. 3 depicts a wet abrasive blasting system comprising an embodiment of a dual controlled dead man's system configured for use with an electric dead man's switch.

In embodiments of the dual control dead man's system, such a pneumatically controlled dead man's circuit may be conveniently converted to an electrically controlled dead man's circuit. The electrically controlled dead man's system works similarly to the pneumatically controlled system and is shown in FIG. 3. The electrically controlled dead man's system comprises a power supply 14d, an electrical dead man's switch 13, an electrical conductor 14c connected to a solenoid in the relay valve 21. When the dead man's electrical switch 13 is closed, the solenoid (FIG. 4-30) is energized creating a magnetic field sufficient to shift a valve plunger (FIG. 4-22) in the relay valve (FIG. 4-21), for example, and opening orifice (FIG. 4-24) that provides fluid communication between a source of pressurized gas and the spool chamber in the relay valve (FIG. 4-21). The pressurized gas (see FIG. 4) shifts the spool 27 to the operating position in the relay valve 21 (the relay valve 21 is shown in the venting position in FIG. 4, and the relay valve in FIG. 5 is shown in the operating position) thereby providing fluid communication from pressurized gas port (FIG. 4-21a) to control circuit inlet/outlet 21c to pressurized control circuit (FIG. 3-20) and open the normally closed air shut-off valve (FIG. 3-17) and the normally closed slurry shut-off valve (FIG. 3-18) so the blasting media may flow through the blast hose (FIG. 3-11) to the blast nozzle (FIG. 3-12). As above, the embodiment shown in FIG. 2 and FIG. 3 is a wet abrasive blasting system, but the dual control dead man's system may be used on other blasting systems or other system that has a dead man's switch. If the handle of the dead man's switch (FIG. 3-13) is released, the handle of the dead man's switch (FIG. 3-13) is biased, opening the electrical circuit. The solenoid is de-energized causing the plunger (FIG. 4-22) to be biased to close orifice (FIG. 4-24) and open vent orifice (FIG. 4-25) allowing the spool chamber (FIG. 4&5-26) and control circuit (FIG. 2&3-20) to be vented, the spool in the relay valve (FIG. 4&5-21) is biased to the venting position causing the pressurized gas to be vented from the control circuit (FIG. 2&3-20) through a vent port (FIG. 4-21b), and the shut-off valves (FIG. 3-17 and 18) return to the closed position. The shut off valve (FIG. 3-17 and 18) may be reopened by again engaging the dead man's switch.

In one embodiment, the relay valve (FIG. 4-21) comprises at least three ports; a pressurized gas port (FIG. 4-21a) in fluid communication with a source of pressurized gas, a control circuit inlet/outlet (FIG. 4-21c) in fluid communication with a control circuit (FIG. 2&3-20) for at least one shut off valve, and a vent port (FIG. 4-21b) in fluid communication with a low pressure environment, typically an exhaust port to the environment under atmospheric pressure. The relay valve (FIG. 4-21) may further comprise a pneumatic dead man port (FIG. 4-21d) in fluid communication with a control line (FIG. 2-14b) of a pneumatic dead man's system. Note: this port (FIG. 4-21d) serves the dual function of also being the vent port for the spool (FIG. 4&5-27) through chamber and passageway (FIG. 4&5-26).

Therefore, embodiments of a safety shut-off system capable of being controlled by an electric dead man's switch or a pneumatic dead man switch comprise a relay valve comprising an electrical control connection and a pneumatic control connection. In its venting position (see FIG. 4), the relay valve 21 provides fluid communication between a control circuit 20 and a low pressure environment such as the atmosphere. The electrical connection may be connected to a power source capable of energizing a solenoid to shift a plunger in the relay valve 21 to allow pressurized gas to shift a spool from its normal venting position (see FIG. 4) to the operating position (see FIG. 5).

Embodiments of the control circuit comprises pneumatic piping system connected to at least one shut-off valve and connected to an outlet of the relay valve; wherein the pneumatic connection is configured to vent to the atmosphere when the electrical dead man switch is connected to the electrical connection and the pneumatic connection is configured to receive pressurized gas from the pneumatic dead man's switch when the pneumatic dead man switch is connected to the pneumatic connection. This is made possible by the check-type quick-couplers (FIG. 2-32) within the pneumatic dead man control circuit. Other embodiments may comprise electrically operated shut off valves that may be energized by activation of an electrical circuit in the relay valve.

The inventor determined that if he could develop a "dual" pneumatic or electric dead man's switch system—one that could operate with either a pneumatic or an electric dead man switch, most of the labor and expense for converting a pneumatic unit into an electric unit would be eliminated. An embodiment of a safety shut-off system capable of being controlled by an electric dead man's switch or a pneumatic dead man's switch comprises a relay valve configured to be connected to a pneumatic dead man's switch or an electric dead man's switch. The relay valve may be activated by either the supply of electricity to a solenoid or by a direct supply of pressurized gas to a spool chamber in the relay valve without energizing the solenoid. In one embodiment, the plunger of the relay valve may be shifted from its normally closed position to an open position by energizing the solenoid. In the operating position, the relay valve provides fluid communication between a source of pressurized gas and a shut off control circuit as the shut off valve control circuit is pressurized. At least one shut off valve is opened allowing the blasting process to be performed. In such embodiments, a spool in the relay valve is shifted from the normally closed position to the operating position by engaging the dead man's switch (electric or pneumatic). If the dead man's switch is subsequently released, the spool in the relay valve will return to its normally closed position allowing the pressurized gas in the shut off control circuit to be vented to atmospheric pressure causing any shut off valve to close.

When an electric dead man control is desired, or necessary due to regulations, the dead man's switch is an electrical switch that is in electrical communication with the relay valve. A solenoid in the relay valve is in an electrical circuit with the dead man's switch. The dead man's switch can open or close this electrical circuit to energize or de-energized the solenoid. The relay valve (FIG. 3-21) is typically configured such that the control circuit (FIG. 3-20) is vented through the relay valve to atmospheric pressure and the shut off valves (FIGS. 3-17 and 18) are closed when the dead man's switch is opened. Typically, the shut off valves (FIG. 3-17 and 18) are biased closed by a spring and opened by pressurized gas. The relay valve (FIG. 4-20) comprises the electric solenoid that is capable to shift a plunger (FIG. 4-22) in the relay valve (FIG. 4-21) to apply pressurized gas to a spool chamber (FIG. 4-26). The spool (FIG. 4-27 and FIG. 5-27) is shifted to provide fluid communication between the source of pressurized gas and the control circuit (FIG. 3-20). The air pressure in the control circuit (FIG. 3-20) opens the shut-off valves (FIGS. 3-17 and 18) when the electrical circuit is completed by closing the electrical switch in the dead man's switch. As in the pneumatic system, the handle in the electrically operated dead man's switch is biased in the open position so the dead man's switch must be engaged and held, to open the shut off valves (FIG. 3-17 and 18) and operate the blasting system.

Figure 4:
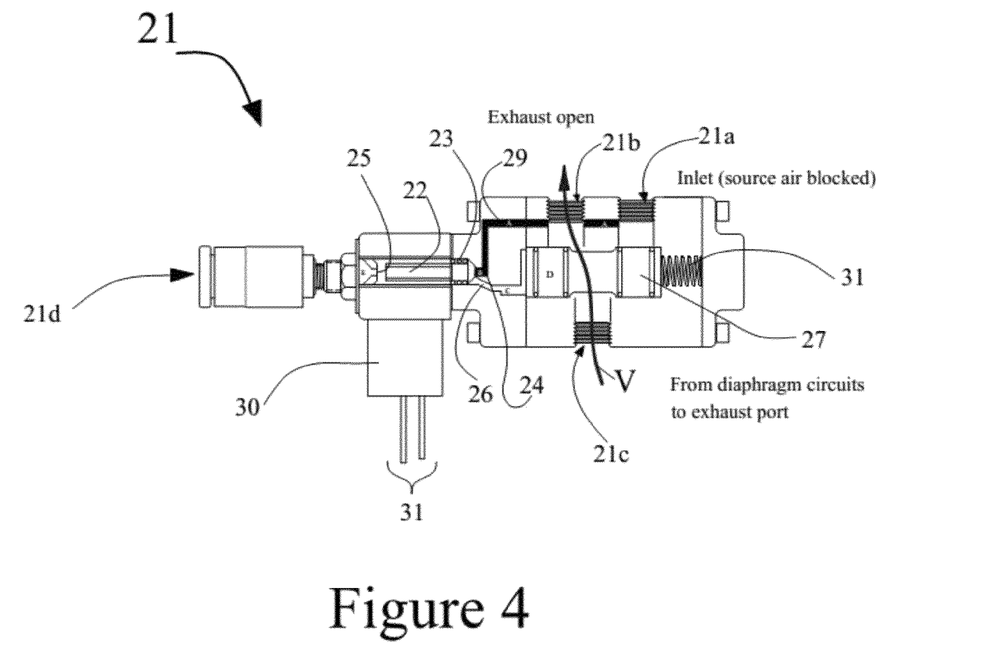
FIG. 4 depicts an embodiment of a relay valve for an embodiment of the dual controlled dead man's system with a spool in a venting position.
Figure 5:
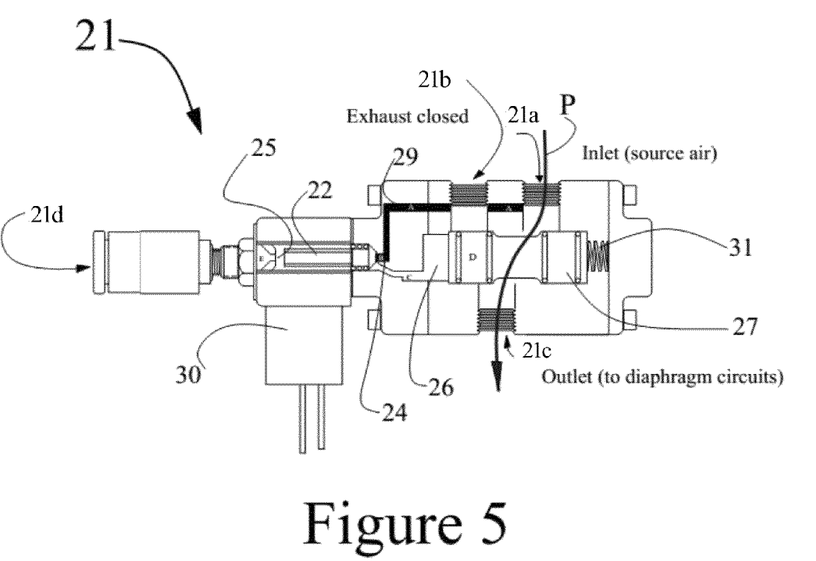
FIG. 5 depicts an embodiment of a relay valve for an embodiment of the dual controlled dead man's system with a spool in an operating position.

An embodiment of the relay valve 21 is shown in the shut off position in FIG. 4. The relay valve comprises three primary ports. Pressurized gas port (FIG. 4-21a) is in fluid communication with a source of pressurized gas (FIG. 3-19a), vent port (FIG. 4-21b) is vented to a low pressure environment, typically the ambient environment, and control circuit inlet/outlet (FIG. 4-21c) is connected to the control circuit (FIG. 3-20). In the shut off position, the spool (FIG. 4-27) is biased by the spring (FIG. 4-31) to allow fluid communication between the control port (FIG. 3-20) and the vent port (FIG. 4-21b) as shown by arrow V. In this position, the control system (FIG. 3-20) is not pressurized and shut off valves (FIGS. 3-17 and 18) are closed.

An embodiment of the relay valve 21 is shown in an operating position in FIG. 5. In the operating position, the spool (FIG. 5-27) is shifted against the bias of the spring (FIG. 5-31) to an operating position to allow fluid communication between the control system (FIG. 3-20) and the pressurized gas port (FIG. 5-21a) as shown by arrow P. In this position, the control system (FIG. 3-20) is pressurized and shut off valves (FIGS. 3-17 and 18) are opened allowing the blasting process to operate. As previously discussed, the spool (FIG. 5-27) may be shifted pneumatically by operation of an electrical or pneumatic dead man's switch. For the spool to be shifted pneumatically, the control line (FIG. 2-14b) of the dead man's system is connected to pneumatic dead man's port (FIG. 4-21d). Upon engagement of the dead man's switch, the control line (FIG. 2-14b) is pressurized conveying pressurized gas through the pressurized dead man's port (FIG. 4-21d), through vent port (FIG. 4-25) and pressurizing spool chamber (FIG. 4-26). The pressurized gas in spool chamber (FIG. 4-26) shifts spool (FIG. 4-27/FIG. 5-27) against the spring (FIG. 4-31/FIG. 5-31) from the venting position shown in FIG. 4 to operating position shown in FIG. 5. Plunger (FIG. 4-22) does not need to move to shift the spool (FIG. 4-27) for the pneumatically controlled dead man's system.

For the spool to be shifted electrically, the solenoid (FIG. 4-30) in the relay valve (FIG. 4-21) is energized by closing the electric circuit in the electric dead man's switch (FIG. 1-13) connected to the solenoid connectors (FIG. 4-31). Upon engagement of the dead man's switch, the solenoid (FIG. 4-30) creates a magnetic field sufficient to shift plunger (FIG. 4-22) from the closed position to an open position. This blocks the vent port (FIG. 4-25) and allows fluid communication between the pressurized gas port (FIG. 4-21a) through channel (FIG. 4-29) into spool chamber (FIG. 4-26). As in the pneumatic system, the pressurized gas in spool chamber (FIG. 4-26/FIG. 5-26) shifts spool (FIG. 4-27/FIG. 5-27) against the spring (FIG. 4-31/FIG. 5-31) from the venting position shown in FIG. 4 to operating position shown in FIG. 5.

For the electrically operated dead man's switch, the air relay valve requires a source of electric power with the required voltage of the solenoid to electrically operate the air relay valve. This source of power can be 12V DC and may be taken from the charging system of the air compressor used to power the abrasive blaster, for example. The electric source can also be house current converted to 12V DC, a solar panel, batteries, or any other appropriate electrical supply, for example. Solenoids are also commonly available in 24V DC and can be matched with 24V DC charging systems (also quite common in air compressors), for example.

Another embodiment of the invention comprises two relay valves (one pneumatic and one electric) connected to a manually operated relay valve. By the use of a manually operated air relay, the air flow may be switched between the two different relay valves. Therefore, embodiments of the invention may include one relay valve that may be pneumatically actuated or electrically actuated or two separate relay valves, one pneumatically actuated and one electrically actuated.

To convert the electrically controlled relay valve to a pneumatically controlled relay valve, the inventor connected pressurized gas to the air vent (FIG. 4-25). Using the air vent as a source of pressurization to the relay valve, proved problematic because the spool in the relay valve did not shift properly and started to rapidly shuttle back and forth from its normal position to the actuated position. Further experimentation and testing determined that if the spool had back pressure—developed by source air being directed through the active position of the spool into a contained volume chamber (such as a control circuit), this shuttling issue was positively resolved.

Testing proved that an electrically controlled air relay, which lifts a magnetically actuated, spring-loaded plunger off of its seat to allow compressed air into a spool chamber for the purpose of moving the spring biased spool into the active operating position, can also be controlled by applying air to the vent circuit (in reverse of the vent's intended direction of flow) as long as the resultant application of source air (passing through the now open spool circuit created by the shift of the spool), is directed into a confined chamber (in other words there is sufficient back pressure to prevent the spool from rapidly shifting back and forth to its normal position).

This discovery made it possible to use only one typically electrically controlled air relay, which also functions as a pneumatically controlled relay when compressed air was applied to the vent circuit—thus substantially reducing cost and simplifying the air control circuit.

The addition of check-type quick-couplers in the pneumatic dead man circuit (FIG. 2-32) further enhanced the discovery because there is no need for a manually operated air relay to change or alter the internal air control circuits when the pneumatically controlled dead man switch is disconnected and only the electrically controlled dead man switch is being used.

The results of the invention are that there is no need to modify or change anything within the control panel of a blast system or other system when changing from one type of dead man switch to the other (due to application). No switches have to be thrown, no manual relays have to be activated, and no internal airlines have to be altered or rerouted. The need for higher-level technical involvement is no longer necessary, because all necessary replacement components are simple and external to the control panel. Rental companies, for example, may simply stock two types of blast hoses—one for pneumatic dead man applications and one for electric dead man applications—and then rent the appropriate type of blast hose to fit the application. Everything else is automatically handled inside the control panel—it is simply a function of whichever blast hose assembly type (which includes the dead man handle and its pneumatic or electric connections) is connected to the panel. The relay valve recognizes which control signal is being sent and works accordingly with the dead man switch—be it electrical or pneumatic.

The embodiments of the described dual controlled dead man's system are not limited to the particular embodiments, components, method steps, and materials disclosed herein as such components, process steps, and materials may vary. Moreover, the terminology employed herein is used for the purpose of describing exemplary embodiments only and the terminology is not intended to be limiting since the scope of the various embodiments of the present invention will be limited only by the appended claims and equivalents thereof.

Therefore, while embodiments of the invention are described with reference to exemplary embodiments, those skilled in the art will understand that variations and modifications can be effected within the scope of the invention as defined in the appended claims. Accordingly, the scope of the various embodiments of the present invention should not be limited to the above discussed embodiments, and should only be defined by the following claims and all equivalents.

The invention claimed is:

1. A pneumatically controlled safety shut-off system capable of being controlled by either an electric dead man's switch or a pneumatic dead man's switch, comprising:
a relay valve comprising a spool, a pressurized gas port, a vent port, a control circuit inlet/outlet, and pneumatic dead man's port, wherein the spool is biased toward a venting position wherein the control circuit inlet/outlet in fluid communication with the vent port;
the relay valve further comprises a electrically operated solenoid valve; wherein the solenoid valve in its operating position provides fluid communication between the pressurized gas port and a spool chamber in the relay valve and at the same time blocks the pneumatic dead man's port, and the solenoid valve in its venting position provides fluid communication between the pneumatic dead man's port and the spool chamber.

2. The pneumatically controlled safety shut off system of claim 1, wherein pressurized gas, sufficient to overcome the biasing force of a spool spring, is in fluid communication with the pressurized gas port.

3. The pneumatically controlled safety shut off system of claim 1, wherein the plunger in its open position closes a port to the pneumatic dead man's switch.

4. The pneumatically controlled safety shut off system of claim 1, wherein an electrically operated dead man's switch is capable of being connected to the relay valve's solenoid and engagement of the electrically operated dead man's switch shifts the plunger from its venting position to its operating position.

5. The pneumatically controlled safety shut off system of claim 1, wherein a control circuit is in fluid communication with the control circuit inlet/outlet and the control circuit is in fluid communication with at least one pneumatically operated shut off valve.

6. The pneumatically controlled safety shut off system of claim 1, wherein a control line from a pneumatic dead man's switch is connected to the pneumatic dead man's port.

7. The pneumatically controlled safety shut off system of claim 6, wherein engaging the pneumatic dead man's switch provides fluid communication between a source of pressurized gas to a spool chamber within the relay valve and the pressure of the source of pressurized gas is sufficient to shift the spool from the venting position to the operating position.

8. The pneumatically controlled safety shut off system of claim 7, wherein the operating position provides fluid communication between a source of pressurized gas and the control circuit.

9. The pneumatically controlled safety shut off system of claim 1, wherein a check-valve type quick-coupling is connected to the pneumatic control line port.

10. The pneumatically controlled safety shut off system of claim 1, wherein the pneumatic dead man's port is also a exhaust port for the spool chamber.

11. A blast system comprising:
a relay valve configured to be operated by either a pneumatically controlled dead man's switch or an electrically operated dead man's switch, wherein the relay valve comprises a spool, a pressurized gas port, a control circuit vent port, a control circuit inlet/outlet, and pneumatic dead man's port; wherein the spool is biased toward a venting position wherein the venting position comprises the control circuit inlet/outlet is in fluid communication with the control circuit vent port.

12. A blast system comprising:
a relay valve configured to be operated by either a pneumatically controlled dead man's switch or an electrically operated dead man's switch, wherein the relay valve comprises a spool, a spool chamber, and a pneumatic dead man's port; wherein the pneumatic dead man's port is also a exhaust port for the spool chamber.

* * * * *